Patented Feb. 6, 1940

2,189,737

UNITED STATES PATENT OFFICE 2,189,737

RESINS OF THE UREA-ALDEHYDE CONDENSATION TYPE AND THEIR SOLUTIONS

Boris N. Lougovoy, New York, N. Y., assignor to Ellis-Foster Company, a corporation of New Jersey No Drawing. Application April 16, 1930, Serial No. 444,873

7 Claims. (Cl. 260—29)

This invention relates to urea resins, by which term I embrace urea-aldehyde condensation products such as urea-formaldehyde bodies, including derivatives of urea such as thiourea, and the like, functioning in the same or analogous way, and also urea resins modified by co-reaction or association with other substances such as thiourea, thiocarbanilide, phenolic bodies such as phenol, cresol, naphthol, and the like, and their various compatible condensation products, and I also include simple mixtures of the foregoing with resins, including shellac and other natural resinous bodies, casein, gelatine and other proteids, and so forth. The material which follows is derived substantially from my copending applications Serial Numbers 689,187, 679,754 and 708,017, of which application the present application is a continuation in part. These applications have now become patents numbered respectively 1,756,251, 1,779,551, and 1,756,252.

As stated in Serial 689,187 (page 7) a large number of uses may be found for the present invention in its various adaptations in the varnish, lacquer, paint and enamel industry, also as an impregnating material, its use as a cement and for the stiffening of felt used in making hats. The resinous product of the present invention or solutions thereof may be used in connection with the fabrication of artificial glass for various purposes, such as lenses, windshields, revolving doors, and so forth. There also are a number of applications in the novelty field, such as the production of imitation gems, beads, cigarette and cigar holders, pipe stems, umbrella and cane handles, fountain pens, billiard balls, ashtrays, phonograph records, camera parts, grinding wheels, gears, artificial amber, insulation and various white or light colored molded articles, including buttons, inkstands, ornamental articles and various dishes employed as receptacles for culinary purposes or otherwise. Employed with suitable fillers, such as wood flour and the like, panels, wall board, parts for furniture and other similar bulky uses are contemplated within the field of application of the present invention. Some of the articles mentioned above may, if needs be, have a reinforcing of appropriate wire netting. Sheets of paper or cloth may be cemented together and articles may be built up of impregnated sheets of fibrous material which are fused together by hot-pressing Products which are soluble in various organic solvents may be made and these are of utility in connection with the production or fabrication of many of the aforesaid articles.

While I do not wish thereby to be limited, I shall give as illustrations principally urea formaldehyde condensation products which are made ordinarily by reaction in an aqueous medium, the aqueous formaldehyde or formalin furnishing the water in which the reaction is conducted. It is desirable in many cases, as I have noted in some of the foregoing applications, as for example Serial 708,017 (page 4), to employ catalysts either of an acid or alkaline character in bringing about the reaction between urea and formaldehyde. In other cases, however, I may have the solution neutral or free from catalytic substances. There are some advantages in using an acid catalyst, as I have pointed out in the applications previously recited. The various acids, particularly organic acids such as the dibasic acid phthalic acid, used in the form of the anhydride, accelerate the reaction of conversion very considerably. This does not mean that I exclude mineral acids such as sulphuric or hydrochloric acid, but these are somewhat harsher in their action and the reaction is not as readily controlled as when milder organic acids are employed, and in the latter case any residue of acid in the finished product usually may be disregarded. Therefore, without setting forth here the numerous acid catalysts which I have mentioned in my previous applications, I may state that I am able to use any of these and various others as required. An acid catalyst is less likely to cause discoloration when the condensation product is hot-pressed. Alkaline catalysts, such, for example, as hexamethylenetetramine, are more prone to cause discoloration under the same conditions. However, a slight discoloration in many cases may not be objectionable, especially when the product is to be strongly pigmented or when wood flour, and the like, is used in the plastic material. Again, the catalyst may be dispensed with entirely and the reaction conducted under strictly neutral conditions.

When, however, I refer to neutrality I contemplate that range which is covered by the usual or standard test for acidity and alkalinity, namely, litmus. Recently, of course, new and very exact methods of testing reactions of this kind have been developed and more precise shades of acidity or alkalinity can now be ascertained than previously was embraced by the usual litmus test. I refer to the determination of the hydrogen ion concentration. Litmus is not sensitive over a range of perhaps 8 or 9 on the one hand to 4 or 5 on the other. Within this area, which now may be more definitely and precisely ascertained by hydrogen ion determinations, litmus shows neither an acid nor alkaline reaction and therefore such a range represents approximately the condition of neutrality given by the litmus test.

In some cases a high proportion of acid catalyzer may be employed, as I have disclosed in some of the illustrations given in the applications referred to.

Urea and aqueous formaldehyde (formalin containing about 40 per cent of actual formaldehyde) react, on heating together, to yield a syrupy product which becomes thicker on cooling. Boiling for 15 minutes to 1 hour usually suffices to bring about the conversion. The reaction is accelerated by the addition of acid bodies. The presence of acid substances also tends to preserve the color. Alkalies, on the other hand, are prone to cause discoloration and should be used with care. Reaction of urea and formaldehyde in a medium to which neither acid nor alkali has been added oftentimes is desirable in order to obtain a syrup of approximate neutrality. While the color may not be as light as when prepared with the aid of an added acid catalyst, it serves well for many purposes, e. g., as a lacquer for brass and darker metals, for incorporating with wood flour to make molding compositions and for numerous other purposes.

Syrups made in this way may be thinned to some extent with organic solvents such as methyl or ethyl alcohol, or better with a ketone such as acetone. For ordinary purposes the syrup may be diluted with an equal volume of acetone, as noted in Serial 689,187. This provides a solution which may be used as a varnish or impregnating medium. A coating of the material slowly hardens on exposure to the air and much quicker on baking. Thus such a solution may be applied to metal surfaces and the articles baked in order to produce a hard transparent coating.

Acetone will mix in the cold with many urea-formaldehyde syrups. Alcohol, however, does not mix quite so well and is best added to the hot syrup. Furfural is an excellent solvent for the urea-formaldehyde condensation product, especially when the latter has not been subjected to a high degree of heat. Another solvent is phenol. Thus it is possible to use as solvents (a) Light volatile solvents such as acetone, for the syrup;

(b) Slow drying solvents or "high-boilers" such as furfural;

(c) Practically non-drying solvents such as phenol.

Moreover, mixtures of light and heavy solvents may be used. These may be solvents which dissolve nitrocellulose so that the latter may be incorporated in some cases.

I have, in Serial 689,187, proposed to prepare a solution in furfural of the well-dried resinous urea complex and mix this with a solution of nitrocellulose in acetone. A clear product can thereby be obtained which can be used as a coating composition. I may use the nitrocellulose in varying proportions with respect to the urea-aldehyde condensation product. Thus to 100 parts of the latter I may use from 5 to 50 parts of nitrocellulose. Other cellulose esters (e. g., acetate) and also cellulose ethers may be mixed with the urea-aldehyde material. Also natural resins, such as shellac in solution, either aqueous or alkaline, may be added in some cases to solutions of the urea complex.

In Serial 679,754 urea complexes are described which may be held in solution in mixtures of equal parts of a benzol hydrocarbon and acetone or methyl or ethyl alcohol. A solution of the urea resin in acetone-alcohol and also in benzol-methanol was found to dissolve nitrocellulose. I have even added a drying oil such as linseed oil to a solution of the complex in benzol-alcohol. A number of these solutions were found suitable for application to wood or other surfaces to furnish light colored coatings.

The preferred procedure of making the resin-syrup is to boil together the urea (and/or urea derivative) for a few minutes. An open vessel may be used. A reflux condenser also can be used, or the reaction vessel may be equipped with an ordinary (non-refluxing) condenser to collect any distillate and recover formaldehyde. In some cases (Serial 689,187) the heating may be carried out in an autoclave. This will permit pressures above atmospheric to be used if desired.

The following examples illustrate a variety of urea complexes, including acid and neutral products, as well as those in which phenol, cresyl acetate, tannic acid and the like have been used. Proportions are by weight.

EXAMPLE 1.—Boil for 12 or 15 minutes in an open flask 15 parts each urea and phthalic anhydride with 60 parts of formalin of 37 to 40 per cent strength.

EXAMPLE 2.—React the urea and formalin without the phthalic anhydride, hence under practically neutral conditions. Boil for the same period.

EXAMPLE 3.—Boil together for 15 minutes 50 parts each urea and phthalic anhydride and 150 parts formalin.

EXAMPLE 4.—In like manner boil 50 parts urea and 150 parts formalin to yield a syrupy product.

EXAMPLE 5.—Boil together urea 10 parts, phthalic anhydride 20 parts and formalin 60 parts. The syrup obtained in this way is somewhat more miscible with acetone than that of Example 3.

EXAMPLE 6.—Urea 10 parts, formalin 60 parts. Boil together under neutral conditions.

EXAMPLE 7.—Urea 20 parts, phthalic anhydride 10 parts, formalin 60 parts.

EXAMPLE 8.—Urea 20 parts, phthalic anhydride 50 parts and formalin 50 parts. Boil to form a pasty white product.

EXAMPLE 9.—Like Example 8, but omit the phthalic anhydride in order to react in substantially neutral solution.

Products obtained as herein described when in the initial syrupy or soluble form may be very quickly transformed into an infusible product by heating to 110–130°. This enables various molding compositions and molded articles to be obtained as will be subsequently described.

Aqueous solutions generally tend to thicken and set to a solid pasty mass in the course of time. When thinned with acetone however the solutions show a much greater permanency which is desirable for many applications.

Various tests were made with the syrupy material such as described in the examples with the object of producing molded articles which were heat resistant.

EXAMPLE 10.—50 parts by weight of syrup obtained in Example 1 were mixed with 100 parts of asbestos fibre and dried in a vacuum to 90°, then ground and pressed for 10 minutes in a hydraulic press at 110° C. An infusible heat-resistant molded article was obtained having a good glossy surface, slightly gray in color due to the asbestos employed.

EXAMPLE 11.—In another case equal parts of the syrup and wood flour were well mixed and dried up to 50° C. in a vacuum drier until the moisture was removed and then ground. Finally it was air-dried for 4 hours. On pressing in a hydraulic press at 110° C. for 10 minutes, pressure of 3000 pounds, a light yellow translucent hard tough molded article was obtained.

A temperature of 110° C. is a relatively low one for molding purposes and was used in the present case in order to give as favorable results as possible in regard to light color. The temperature of molding may, however, be increased with consequent increase in speed of setting or curing in the mold to produce an infusible article which may be taken from the mold without necessity of cooling.

In place of urea I may use urea derivatives such as thiourea and substituted ureas having similar or equivalent properties. In place of formaldehyde I may use paraform or other equivalent substance or a mixture of formaldehyde with acetaldehyde or other aldehydes, etc.

In addition to phthalic anhydride or phthalic acid, other organic acids both monobasic, dibasic and polybasic may be used, including acids of both aliphatic and aromatic series. The following illustrates the results obtained with a series of such acids.

In the following series the acid is used in the proportion of 1 part by weight to 1 part of urea and 4 parts of aqueous formaldehyde of 40 per cent strength. The data first indicates the results obtained on boiling the ingredients together for 5 minutes and also the setting or hardening effect produced by heating a portion of each of the samples under like conditions on a hot plate to determine the comparative rate of setting and make observations on any discoloration brought about by the action of heat.

EXAMPLE 12. *Benzoic acid.*—White opaque syrupy liquid containing much crystalline material. Hardens readily on heating on hot plate. Fairly white product.

EXAMPLE 13. *Citric acid.*—The mixture effervesces on heating giving a perfectly clear syrup. Rapidly hardens on heating on hot plate with slight yellowing.

EXAMPLE 14. *Acetic anhydride.*—The reaction is exothermic and a clear white jelly is obtained. On heating on hot plate a snow white infusible glossy mass resulted.

EXAMPLE 15. *Propionic acid.*—Very mild reaction. Solution white but not syrupy. Slight turbidity. On heating on the hot plate a transparent hard white mass is obtained.

EXAMPLE 16. *Gallic acid.*—On heating the ingredients together a clear thick syrupy solution formed which on cooling became clouded and slightly yellowish. A hard glossy yellowish resin was obtained by heating on the hot plate.

EXAMPLE 17. *Lactic acid.*—The solution is clear, water white and syrupy. On the hot plate the material hardens to a resin of yellowish cast.

EXAMPLE 18. *Maleic acid.*—Yields a slightly yellow thin syrup free from sediment. However, when heated on the hot plate a spongy brownish mass is obtained which is rather weak.

EXAMPLE 19. *Salicylic acid.*—A water white syrup with some white crystalline matter results. When this product is heated on the hot plate a tough snow white resin readily forms.

EXAMPLE 20. *Tartaric acid.*—When the ingredients are heated together effervescence is observed and a clear solution not particularly syrupy results. Heating on the hot plate gives a fairly tough resin of a pure white color.

EXAMPLE 21. *Acetyl salicylic acid.*—On heating the ingredients a very thick syrup formed which could be changed to a transparent jelly. This reacted very quickly on the hot plate to produce a clear transparent resin. The rate of hardening or curing is notably rapid.

EXAMPLE 22. *Oxalic acid.*—With this acid a clear rather thin light colored syrup was obtained which on heating on the hot plate set to a hard mass.

EXAMPLE 23. *Mucic acid.*—A white syrup with much white solid matter resulted on reacting the materials together. When exposed on the hot plate a white resin resulted which was considerably tougher than that obtained with maleic acid.

EXAMPLE 24. *Tannic acid.*—A yellow solution was obtained passing through a syrupy stage to thin jelly which was yellowish brown and transparent. On heating a dark brown resin resulted. The time of curing on the hot plate was fairly brief.

EXAMPLE 25. *Trichloracetic acid.*—The reaction in this case was vigorous and in 3 minutes time a jelly was produced. On standing the jelly became opaque but along the walls of the vessel films of the material were flexible and transparent. The reaction takes place without the formation of bubbles and this acid is suggested for use in connection with the manufacture of sheets resembling glass and similar products. On the hot plate a white resin resulted which appeared to have considerable elasticity.

EXAMPLE 26. *Stearic acid.*—The reaction in this case is poor and much separation occurs. The product obtained on the hot plate is opaque but appears to be lacking in strength.

Of course, it should be understood that, from the standpoint of acidity, or hydrogen ion concentration, the action of gallic, tannic and stearic acids is very mild. Their catalytic effect in this respect is much less than a dicarboxylic acid such as phthalic acid or anhydride.

Phenol may be a component of the reaction mixture in some cases.

EXAMPLE 27.—Boil 100 parts by weight of phenol, 25 parts urea and 160 parts of 40 per cent formaldehyde solution in an open flask in the presence of about 1 part of concentrated hydrochloric acid. (After boiling for a short time a white mass separated and the boiling was continued for 15 minutes. When cold a white, rather brittle porcelain-like soluble resin was obtained. It was washed first with a 2 per cent solution of sodium carbonate and then with water.) The yield of the resin is 178 parts. This resin is opaque and pure white in color. It was exposed to sunlight for a period of nearly two months and during that time there was no discoloration. The opacity of the exterior layers disappeared and a white glass-like coating resulted. This appears to be due to the removal of a small amount of moisture present in the mass.

EXAMPLE 28.—100 parts phenol, 25 parts urea and 100 parts of ordinary aqueous formaldehyde of 40 per cent strength were heated to the boiling point in the presence of approximately 2 parts of sulphuric acid of 50 per cent strength. The heating was carried out under a reflux condenser for a period of 15 minutes. A white resin resulted on cooling which did not harden as quickly as that described in Example 27. It remained a semi-solid rubbery body for a few hours but gradually hardened on standing overnight to form a mass having a procelain-like appearance. The product was washed with sodium carbonate solution and water as in the case of Example 27. On exposure of sample 28 to sunlight for a period of nearly two months no discoloration was observed. It retained its same initial pure white appearance.

EXAMPLE 29.—White composite resin was prepared by boiling for 15 minutes a mixture of 100 parts by weight of phenol, 20 parts urea and 135 parts of 40 per cent formaldehyde solution slightly acidified with hydrochloric acid. The resin obtained, as well as the water separated in the reaction, were examined for the presence of unconverted substances. The resin dissolved in alcohol, benzol mixture, did not show any acid reaction with methyl orange, nor did it give any biuret reaction. It did not give any ammoniacal odor on strong heating, nor any phenolic odor. Tests with ferric chloride showed only a faint greenish gray coloration.

EXAMPLE 30.—A mixture of 50 parts phenol, 50 parts urea and 115 parts of 40 per cent formaldehyde solution, slightly acidified with hydrochloric acid, was slightly warmed when a vigorous reaction occurred and the amount of heat given off was sufficient to keep the liquid boiling for several minutes. At the end of this time a white solid resinous body separated from the hot solution. The product obtained has a glossy surface and a porous structure and was almost infusible on the hot plate. It was insoluble in water and ordinary organic solvents. This resin was exposed to sunlight for a period of about two months and no discoloration was in evidence.

Solutions obtained as above by dissolving the soluble form of this resin in an appropriate solvent and slowly evaporating yielded a transparent colorless fusible resin. When strongly heated this is slightly yellowed or discolored by such heat treatment. It is best to carry out the reaction to avoid the presence of any free phenol.

The addition of hexamethylenetetramine to such solutions of the resin yields on evaporation a product which hardens on baking somewhat more quickly than those to which the hexa is not added. The latter, however, are of better color as the presence of hexamethylenetetramine appears to have a slight discoloring action on exposure to heat.

EXAMPLE 31.—In another case cresylic acid was treated with a slight excess of acetic anhydride in the presence of a trace of sulphuric acid, the reaction being carried out in the cold. The acetate so obtained was mixed, without purification, with about an equal volume of 40 per cent formaldehyde solution. The liquid at first separated into two layers but after boiling for a few minutes a clear, colorless solution resulted which on baking afforded a light colored slightly greenish resin. When the above acetate solution was mixed with paraform an exothermic reaction took place almost instantaneously with the formation of a greenish gray resinous body. Using phenol in place of tar acid or cresylic acid the resin has a tendency to be more reddish in color. The addition of urea to phenyl acetate and subsequent treatment with formaldehyde gave a resin much lighter in color which did not turn red on baking or on long exposure to light. Such a resin may be obtained in a fusible form soluble in a mixture of alcohol and benzol.

In one case urea was added to the acetate solution containing a trace of acid. Upon slight warming all the urea dissolved. To the clear solution thus obtained a 40 per cent solution of formaldehyde was added in one case and in another case paraform in powdered form was introduced. In the latter case heat was evolved immediately with the separation of a rubbery substance which hardened to a firm resin.

As I have stated in Serial 708,017, I may use two molecular proportions of urea to four molecular proportions of formaldehyde and one molecular proportion of phenol. Looking at the reaction from one angle it may be considered a combination between two mols. of dimethylol urea and one mol. of phenol.

EXAMPLE 32.—Thus a proportion may be employed of 120 parts by weight of urea, 320 parts of aqueous formaldehyde of approximately 37 to 40 per cent strength and 94 parts of phenol, to which, in some cases, there may be added an acid substance which has a catalytic effect, 20 parts, or less, by weight, of phthalic anhydride being suitable for the purpose. A clear solution is obtained which on careful heating will in a few minutes time become decidedly milky. Using proportions in grams according to the quantity indicated above and heating with a small flame I found that milkiness occurred in about 12 minutes and at the end of 15 minutes the reaction mixture was boiling spontaneously. After removal of the flame the boiling continued for a matter of 5 minutes or so when separation into two layers occurred and the boiling stopped. Then I applied a flame to the flask containing the solution heating for 10 minutes longer when the bottom layer became a white gummy mass. I poured off the aqueous acid upper layer and on cooling the lower layer obtained a pure white hard mass of resinous fracture. This is not soluble in hot alcohol, acetone nor benzol. Some water remained in this hard mass and I crushed the material to a coarse powder and dried in a vacuum drier at 28 or 29 inches vacuum gage, rising the temperature gradually to 90° C. The powdered or granular material obtained in this way when boiled with water gave an acid reaction to litmus. I found the powder could be molded at 120° C. in a hydraulic press at 2000 pounds pressure and that on subjecting to this temperature for a period of 5 minutes I obtained a molded article which was fairly rigid when hot and could be removed from the mold without the necessity of cooling. It had, therefore, the property of curing or becoming thermo-rigid under these conditions. The molded articles obtained were strong, translucent and light in color, free from any yellow or reddish discoloration.

On the other hand, when the reaction mixture was treated with a base, or for example hexamethylenetetramine added, a molded article was obtained of a reddish-brown color under the same conditions.

However, I do not wish to be restricted to the precise catalyst employed and there might be circumstances under which I would wish to employ a basic catalyst, and possibly others where I would wish to have the solution neutral or free from catalytic substances of either an alkaline or an acid character.

EXAMPLE 33.—In another case I heated a mixture composed of 60 parts by weight of urea, 160 parts of aqueous formaldehyde, 47 parts of phenol and 5 parts of phthalic anhydride. In this case the proportion of the acid accelerator was reduced one-half the amount used in Example 32. The reaction was not so violent and on heating for 20 minutes while a milky solution or incipient emulsion was obtained there was no definite separation or coagulation such as marked the progress of the reaction after that period of heating when employing double the amount of acid catalyst. On evaporating on hot plate a small sample of this solution I obtained a nonvolatile or resinous content of 62 per cent. This determination was made in order to ascertain the proportion of filling material I could use advantageously in preparing a molding composition. I found that the milky solution after 20 minutes heating could be diluted with an equal volume of alcohol without precipitation and I used this milky solution or suspension as a means to incorporate the resin with filling material, in this case 50 parts by weight of titanox and 150 parts of cotton linters. These fillers were used because it was an object to obtain a white or ivory colored molded material. The composition was dried in a vacuum drier with a vacuum gage pressure of approximately 28–29 inches, the temperature being raised gradually to 90° C. The composition was then pulverized and tests were made at different molding temperatures. It was found that the temperature of the hot press could range from 120° C. to about 150° C. without formation of blisters on the molded article. Even at 150° C. there was no sticking to the mold and the article cured or became a thermo-rigid mass in 3 to 5 minutes. A pressure on the ram of 2000 to 3000 pounds was employed. A feature about the product molded at 150° C. for 5 minutes or thereabouts was that it proved to be quite resistant to water, the surface not being materially affected on soaking in cold water for a long period nor by boiling for a short time. The molded article had a white or ivory-colored appearance with a smooth attractive surface. A test disc 2 inches in diameter and 3/32nds of an inch in thickness was tested in a breaking machine by being supported at three points near the periphery and applying pressure at a point in the center. The disc broke at a pressure of about 49 pounds, which indicates the strength to be fairly high, especially when employing a considerable proportion of non-fibrous mineral filler.

In the foregoing examples it will be noted that I have used aqueous formaldehyde in the commercial form which contains approximately 37–40 per cent of actual formaldehyde. It is possible to carry out the reaction with formaldehyde of other strengths or with or without a diluent such as water or organic vehicles. Also the reaction may be carried out under anhydrous conditions by employing paraform or other form of polymerized formaldehyde. The invention is not limited to formaldehyde and its polymers, but also includes the use of other appropriate aldehydes. Likewise it should be understood that where urea is mentioned other compounds which are the equivalent of urea or possess analogous behavior, including any of the thioureas, substituted carbamides, etc., may be employed in a more or less effective manner.

When the complex is made up to contain a phenolic component various phenolic or phenoloid bodies other than phenol may be used, including cresol, xylenol, naphthol, and the like.

It may be added that while I prefer to make light colored or white material, it is feasible to add dyes or pigments to color to various shades as may be required.

In making a molding composition I prefer to use a considerable proportion of a fibrous filler such as wood flour, asbestos, cotton flock or linters. The last mentioned filler has given satisfactory results from the standpoint of light color. However, it is desirable to add a moderate amount of a white mineral filler to overcome what may be termed a starchy appearance of the molded product made with linters as the sole filler. The addition of a strong white pigment improves the color and affords a means of regulating the opacity to the step desired. White pigments such as titanox or lithopone are preferable to zinc oxide, as the latter may neutralize the acid catalyst during the molding operation and cause substances to be formed which are affected by water. Hence I prefer to avoid any pigment of a basic nature when it is an object to produce articles of high water resistance.

The fillers may be incorporated with the resinous binder by impregnation or admixture of a solution or suspension of the resin or the latter may be dried and ground in a ball mill with the filler then passed through mixing rolls to thoroughly incorporate the various components.

EXAMPLE 34.—In the foregoing examples in which phenol was a component of the mix, omit the acid catalyst such as hydrochloric, sulphuric and phthalic acids, otherwise treating in a similar manner. The heating may be extended to a somewhat longer period until tests show the reaction has progressed to the stage desired.

EXAMPLE 35.—Incorporate the resin of Example 34 with a mixed cellulose and mineral filler so that the total filler is composed of a major proportion of cellulose and a minor proportion of mineral filler, e. g., 3 parts linters to 1 part titanox or titanium oxide.

Dyes and pigments as required may be used in these molding compositions, the titanox or lithopone and cellulose background of destarched character serving to bring out advantageously the tones of the coloring agents other than white so employed. A molding composition thus may contain destarched cellulose held in rigid, shaped position by a thermo-set binder comprising a urea-formaldehyde condensation product initially prepared in a substantially neutral medium.

The invention, therefore, embraces a urea-aldehyde resin, specifically a urea-formaldehyde resin (this term including derivatives of urea acting in an analogous manner) which resin at least in its initial stages of resinification is preferably soluble in lacquer solvents whereby it may be applied to surfaces to form lacquer-like coatings: the resin moreover being adapted for use as a binder in the preparation of molding compositions. Furthermore when cellulose is a component of such compositions reaction between resin and cellulose gives rise to formation of complicated bodies, presumably due to interlocking through hydroxyl groups. The hydroxylated urea complex thus has opportunity to condense with the cellulose hydroxyl or other groups which may be present in the cellulose molecule. The starchy effect observed may be attributed to such conversion. Ground wood or wood flour does not exhibit the starchy effect so visibly owing to the darker color of the product. In this case lignin, also a hydroxylated compound, likewise may be expected to react so that a urea resin combination of cellulose and lignin results. Very strong molded articles are thus obtained.

Therefore, while I have referred above to cellulose material as "fillers", I consider cellulose to function in a manner different from inert bodies such as asbestos. A suitable term for cellulose, pure or lignin-cellulose, used in this way, is active filler (or reactive filler).

As indicated in my prior patent applications, the complex is sensitive to heat and should be cured (if molded) within temperature limits preferably ranging from 110° C. to 150° or 160° C. Above about 150° C. there is danger of decomposition to a white granular substance which destroys the surface of the molded article. Therefore, I avoid heating for so long or at such elevated temperatures that granulation sets in. That is, I keep within a temperature range below the granulation point. This is of great importance in securing clean-appearing molded articles.

What I claim is:

1. Method of making a resin composition, comprising reacting a phenol urea and formaldehyde, the latter in excess of equimolecular proportions; and combining a portion at least of the excess formaldehyde in the form of a resinous urea derivative.

2. Method of making a resin composition, comprising reacting a phenol urea and formaldehyde, the latter in excess of equimolecular proportions; and combining a portion at least of the excess formaldehyde in the form of a non-phenolic resin.

3. A process of preparing a resinous material comprising condensing urea with acetaldehyde and formaldehyde in the presence of an inert solvent.

4. A water soluble resinous condensation product of urea, acetaldehyde and formaldehyde.

5. A lacquer comprising a mixture of a concentrated solution of a urea-aldehyde condensation product, and a plurality of low surface tension organic solvents having substantially different boiling points.

6. A composition of matter adapted to be converted by heat to substantially insoluble condition, said composition comprising an aqueous solution of a urea-aldehyde condensation product, a solvent comprising a plurality of low surface tension organic solvents having substantially different boiling points.

7. A composition of matter adapted to be converted by heat to substantially insoluble condition comprising a urea-aldehyde condensation product, a plurality of solvents comprising water and a plurality of low surface tension organic solvents having substantially different boiling points.

BORIS N. LOUGOVOY.